(12) United States Patent
Tsen et al.

(10) Patent No.: US 9,164,537 B2
(45) Date of Patent: Oct. 20, 2015

(54) DISPLAY SCREEN ASSEMBLY HAVING A SELECTIVELY ENGAGEABLE MOUNT ASSEMBLY

(71) Applicant: Toshiba Global Commerce Solutions Holdings Corporation, Research Triangle Park, NC (US)

(72) Inventors: Chiu-Jung Tsen, Hsinchu (TW); Zong-Han You, New Taipei (TW); Cheng-Hong Chen, New Taipei (TW); Wen-Yao Nien, Zhubei (TW); Dean F. Herring, Youngsville, NC (US); Jeff D. Thomas, Raleigh, NC (US)

(73) Assignee: Toshiba Global Commerce Solutions Holding Corporation, Tokyo (JP)

( * ) Notice: Subject to any disclaimer, the term of this patent is extended or adjusted under 35 U.S.C. 154(b) by 265 days.

(21) Appl. No.: 13/835,469

(22) Filed: Mar. 15, 2013

(65) Prior Publication Data

US 2014/0268513 A1    Sep. 18, 2014

(51) Int. Cl.
| | |
|---|---|
| *G06F 1/16* | (2006.01) |
| *H05K 5/00* | (2006.01) |
| *H05K 7/00* | (2006.01) |
| *F16M 11/00* | (2006.01) |
| *G07G 1/00* | (2006.01) |
| *E05B 73/00* | (2006.01) |
| *F16M 11/04* | (2006.01) |
| *F16M 11/10* | (2006.01) |

(52) U.S. Cl.
CPC .......... *G06F 1/1601* (2013.01); *E05B 73/0082* (2013.01); *F16M 11/00* (2013.01); *F16M 11/041* (2013.01); *F16M 11/10* (2013.01); *G06F 1/1632* (2013.01); *G07G 1/00* (2013.01); *F16M 2200/02* (2013.01)

(58) Field of Classification Search
CPC ....................................................... H05K 7/02
See application file for complete search history.

(56) References Cited

U.S. PATENT DOCUMENTS

| | | | |
|---|---|---|---|
| 5,144,290 A | 9/1992 | Honda et al. | |
| 5,187,641 A * | 2/1993 | Muskatello et al. | ...... 361/679.61 |
| 5,362,144 A | 11/1994 | Shioya et al. | |
| 6,186,547 B1 * | 2/2001 | Skabrond et al. | ............. 280/775 |
| 6,288,891 B1 * | 9/2001 | Hasegawa et al. | ........ 361/679.07 |
| 6,609,691 B2 * | 8/2003 | Oddsen, Jr. | ................ 248/278.1 |
| 6,702,604 B1 | 3/2004 | Moscovitch | |
| 6,933,861 B2 * | 8/2005 | Wang | .............................. 341/20 |
| 7,317,613 B2 | 1/2008 | Quijano et al. | |
| 7,458,550 B2 | 12/2008 | Chang | |
| 7,492,580 B2 | 2/2009 | Lee | |

(Continued)

FOREIGN PATENT DOCUMENTS

EP          0145410 A2     6/1985

OTHER PUBLICATIONS

Patent Cooperation Treaty (PCT) International Search Report and Written Opinion, dated Dec. 22, 2014.

*Primary Examiner* — Hoa C Nguyen
*Assistant Examiner* — Xanthia C Cunningham
(74) *Attorney, Agent, or Firm* — Olive Law Group, PLLC

(57) ABSTRACT

A display screen assembly is provided. The display screen defines a channel for allowing selective engagement of the display screen. A mount assembly is provided and includes a base for supporting the display screen assembly about a support surface, and a locking assembly that selectively engages the channel to thereby lock the mount assembly to the display screen.

12 Claims, 5 Drawing Sheets

(56) References Cited

U.S. PATENT DOCUMENTS

| | | | |
|---|---|---|---|
| 7,685,901 B2 * | 3/2010 | Leopold et al. | 74/434 |
| 7,862,084 B2 * | 1/2011 | Maeda et al. | 280/775 |
| 8,072,743 B2 * | 12/2011 | Kissel | 361/679.21 |
| 8,272,104 B2 | 9/2012 | Chen et al. | |
| 8,322,670 B2 * | 12/2012 | Westerink | 248/276.1 |
| 8,371,237 B2 | 2/2013 | Weber | |
| 8,385,074 B2 * | 2/2013 | Karl et al. | 361/726 |
| 8,434,397 B1 * | 5/2013 | Deckard et al. | 89/37.16 |
| 8,776,941 B2 * | 7/2014 | Herzberg | 180/326 |
| 8,794,579 B2 * | 8/2014 | Sturman et al. | 248/284.1 |
| 8,891,249 B2 * | 11/2014 | Stanek et al. | 361/810 |
| 2003/0160138 A1 * | 8/2003 | Rawlings et al. | 248/176.3 |
| 2004/0011932 A1 * | 1/2004 | Duff | 248/157 |
| 2004/0069918 A1 * | 4/2004 | McKinney | 248/274.1 |
| 2004/0079849 A1 * | 4/2004 | Rudolf | 248/276.1 |
| 2004/0155166 A1 * | 8/2004 | Kim | 248/291.1 |
| 2006/0168865 A1 | 8/2006 | Watanabe | |
| 2007/0097617 A1 * | 5/2007 | Searby et al. | 361/686 |
| 2007/0138822 A1 * | 6/2007 | Feit et al. | 296/70 |
| 2009/0076368 A1 * | 3/2009 | Balas | 600/407 |
| 2009/0090476 A1 * | 4/2009 | Grandel et al. | 160/368.1 |
| 2010/0243839 A1 * | 9/2010 | Westerink | 248/276.1 |
| 2010/0315041 A1 | 12/2010 | Tan | |
| 2011/0198460 A1 * | 8/2011 | Stifal et al. | 248/201 |
| 2011/0222238 A1 * | 9/2011 | Staats et al. | 361/679.55 |
| 2012/0104195 A1 * | 5/2012 | Da Costa Pito et al. | 248/205.1 |
| 2012/0113572 A1 * | 5/2012 | Gaddis et al. | 361/679.01 |
| 2012/0256069 A1 | 10/2012 | Fallows | |
| 2013/0242521 A1 * | 9/2013 | Lin et al. | 361/807 |
| 2013/0279968 A1 * | 10/2013 | Li et al. | 403/27 |
| 2014/0211440 A1 * | 7/2014 | Shibuya et al. | 361/772 |

* cited by examiner

DISPLAY SCREEN ASSEMBLY HAVING A SELECTIVELY ENGAGEABLE MOUNT ASSEMBLY

BACKGROUND

1. Field of the Invention

The present invention relates to a display screen assembly having a selectively engageable mount assembly. The mount assembly includes a locking assembly that allows for engagement of the mount assembly with a display screen.

2. Description of Related Art

Display screens are used as a user interface for many electronic systems. For example, personal computers have traditionally used a display screen to display information relevant to the user of the display screen.

Occasionally, it may be desirable to transport the display screen without having to transport the entire display screen assembly. For example, a display screen having a touch responsive display may be used in a commercial or retail setting, however, due to the relatively high costs of the touch responsive display, a user may desire to transport the touch responsive display between one or more mount assemblies. As another example, a retail establishment may want to secure the expensive display screen during hours that the establishment is not open in order to deter theft or vandalism. The mount assembly may be fastened to a surrounding support surface and it may be time consuming to remove the mount assembly.

Typically, if a retailer desired to remove or move display screen assembly, the entire assembly must be unplugged, unsecured, or otherwise disengaged, and then transported to the desired location where the display screen assembly would then have to be plugged back in, secured, or otherwise engaged. This creates a situation where a retailer must expend man hours securing the display screen assembly during open and closed hours of the retail establishment.

Accordingly, there is a need for a display screen assembly in which the display screen is selectively engageable about a mount assembly.

BRIEF SUMMARY

In accordance with embodiments of the present invention, a display screen assembly is provided. The display screen defines a channel for allowing selective engagement of the display screen and a mount assembly. The mount assembly includes a base for supporting the display screen assembly about a support surface and a locking assembly that selectively engages the channel to thereby lock the mount assembly to the display screen.

In accordance with embodiments of the present invention, a mount assembly for a display screen is provided. The mount assembly includes a base for supporting the display screen assembly about a support surface and a locking assembly that selectively engages a channel of the display screen to thereby lock the mount assembly to the display screen.

In accordance with embodiments of the present invention, a display screen is provided. The display screen defines a channel for allowing selective engagement of the display screen with a mounting assembly. The mounting assembly is configured to selectively engaging the display screen with a bayonet that is ingressed within the channel into a locked position and egressed out of the channel into an unlocked position.

DETAILED DESCRIPTION

Exemplary display screen assemblies in accordance with embodiments of the present invention are described herein. Particularly, described herein are exemplary display screen assemblies having a display screen that is selectively engageable about a mount assembly.

Figure 1:
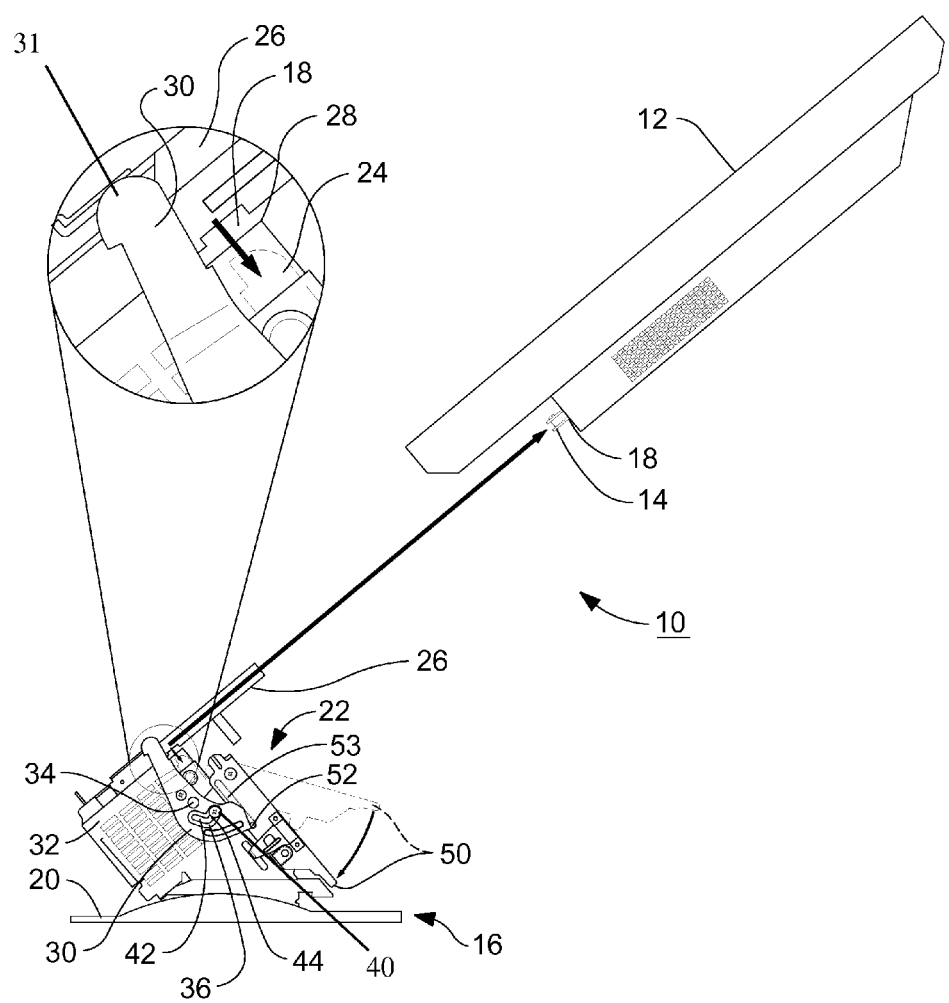
FIG. 1 sets forth a side view of a display screen assembly with a spaced-apart enlarge view of a portion thereof in which a display screen is not in engagement with a base of the display screen assembly in accordance with embodiments of the present invention.

FIG. 1 illustrates a display screen assembly generally designated as 10 throughout the drawings. The display screen assembly 10 includes a display screen 12. The display screen 12 may be any appropriately configured screen and may be used for, as an example, a personal computing screen, touch screen display for point of sale, or the like. The display screen 12 may define a channel 14 for allowing selective sliding engagement of the display screen 12 with a mount assembly 16. The channel 14 may have a square or rectangular like cross-section as shown or may take on any appropriate configuration. The mount assembly 16 may include a base 20 for supporting the display screen assembly 10 about a support surface. The base 20 may include one or more features that allow pivoting of the base 20 relative to the display screen 10. For example, U.S. Utility patent application Ser. No. 13/482,960 filed on May 29, 2012 discloses one or more features for providing pivoting of the base 20 relative to the display screen 10. The contents of U.S. Utility patent application Ser. No. 13/482,960 are hereby incorporated by reference in their entirety.

The mount assembly 16 may include a locking assembly 22 that selectively engages the channel 14 to thereby lock the mount assembly 16 to the display screen 10. The locking assembly 22 may include a bayonet 24. The bayonet 24 may be actuated into the channel 14 of the display screen 12 to thereby selectively engage the display screen 12 with the mount assembly 16. The bayonet 24 may define an arcuate or angled upper facing surface so that the bayonet 24 biases away from the channel 14 when the channel 14 contacts the bayonet 24. A spring or other biasing member may be provided for biasing the bayonet 24 into the ingressed position. In one or more embodiments, the bayonet 24 is ingressed within the channel 14 into a locked position and egressed out of the channel 14 into an unlocked position. The channel 14 may define an opening 18 through which the bayonet 24 extends into.

The locking assembly 22 may further define a rail 26 that extends from the mount assembly 16 as illustrated in FIG. 1. The rail 26 may be configured for being slideably received within the channel 14 so that the display screen 12 is then installed about the mount assembly 16. The rail 24 may define a cross-section that is generally slightly smaller than the cross-section of channel 14. The rail 24 may define an opening 28 through which the bayonet 24 ingresses into the locked position and egresses into the unlocked position. The locking assembly 22 may include a lever 30 pivoted about a casing 32 that is contained within the mount assembly 16. The lever 30 may be pivoted about a pivot point 34. The lever 30 may be operably coupled with the bayonet 24 such that pivoting of the lever 30 imparts ingress and egress translation of the bayonet 24 into and out of the channel 14 and rail 26. A distal end 31 of lever 30 may be configured such that it extends proximal a feature of the display screen 10, such as, for example, channel 14 and is configured such that pivoting of lever 30 as will be described in further detail causes distal end 31 to contact and push generally upwardly on the display screen 10 to separate the display screen 10 from the mount assembly 16. The lever 30 may define a slot 36 that is spaced-apart from the pivot point 34. A pin 40 may operably couple the lever 30 about slot 36 to the bayonet 24 where the lever 30 and bayonet 24 in the one or more embodiments illustrated. The pin 40 joins the bayonet 24 to the slot 36 such that the pin 40 translates within the slot 36 and imparts translation of the bayonet 24 during pivoting movement of the lever 30. The slot 36 may define a first portion 42 in which rotation of the lever 30 relative to the pin 40 imparts translation to the bayonet 24, and further defines a second portion 44 in which rotation of the lever 30 relative to the pin 40 biases the bayonet 24 in the unlocked position. The bayonet 24 may be biased into the locked position by a spring or other biasing mechanism.

Figure 5:
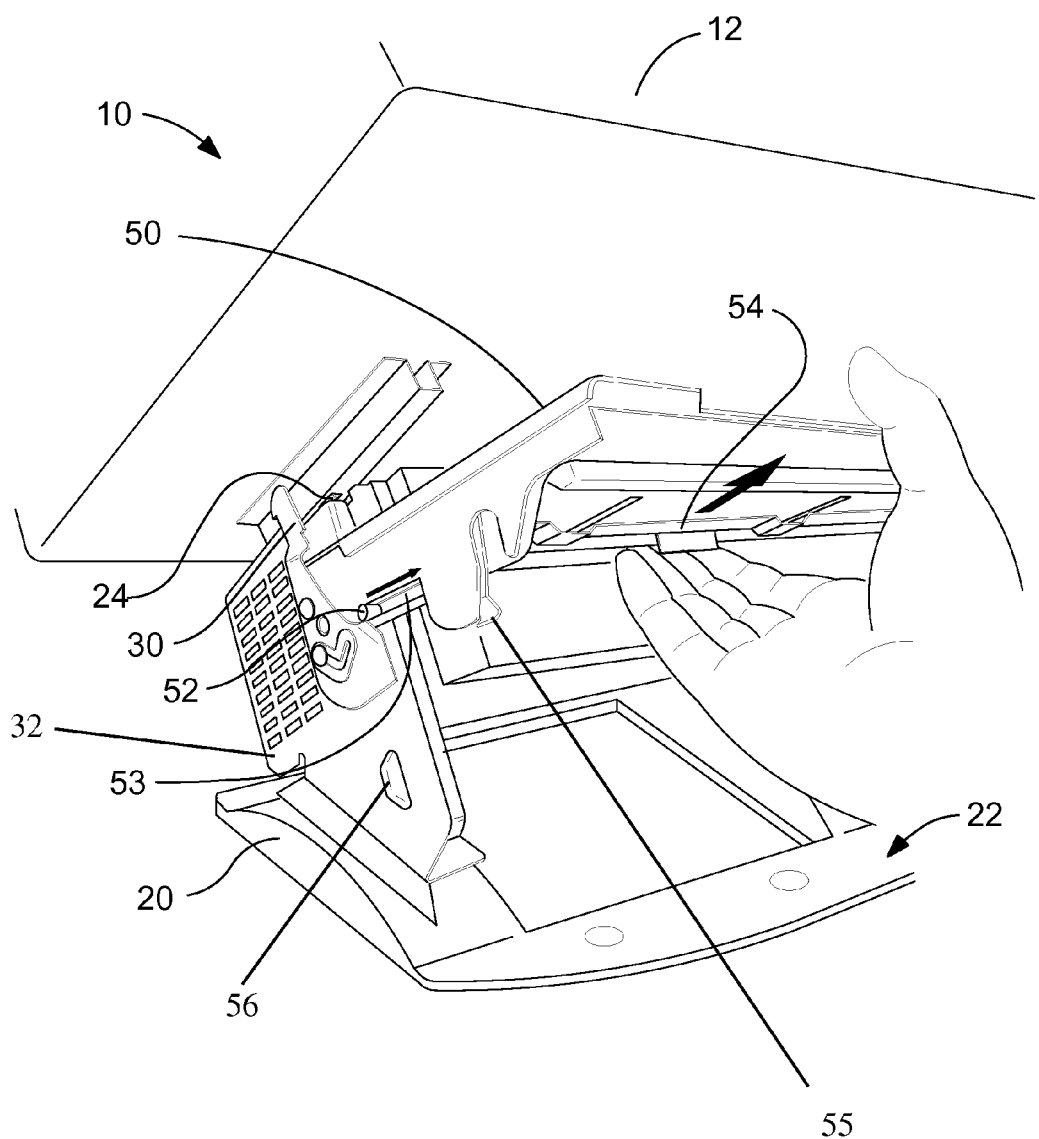
FIG. 5 sets forth a rear facing perspective view of a display screen assembly in which a cover of the base is rotated in order to actuate the locking assembly to disengage the display screen from the base in accordance with embodiments of the present invention.

The mount 16 may include a cover 50 that encloses the locking 22 assembly and is rotatable between an open position (shown in broken lines in FIG. 1) and a closed position (shown in solid lines in FIG. 1). The cover 50 has a cam assembly 52 that is configured for being slid or otherwise translated within slot 53 and engaging the locking assembly 22 to translate the bayonet 24 between the locked and unlocked position. With specific reference to FIG. 5, the cam assembly 52 may have a grip 54 for translating the cam assembly 52 about a slot 53 into engagement with the locking assembly 22. The grip 54 may be accessible by rotation of the cover 50 away from the base 20. The grip 54 may be biased to where the cam assembly 52 is spaced frontwardly of the lever 30. Rotation of the cover 50 imparts translation of the cam assembly 52 into engagement with the locking assembly 22 to translate the bayonet 24 between the locked and unlocked position.

Figure 2:
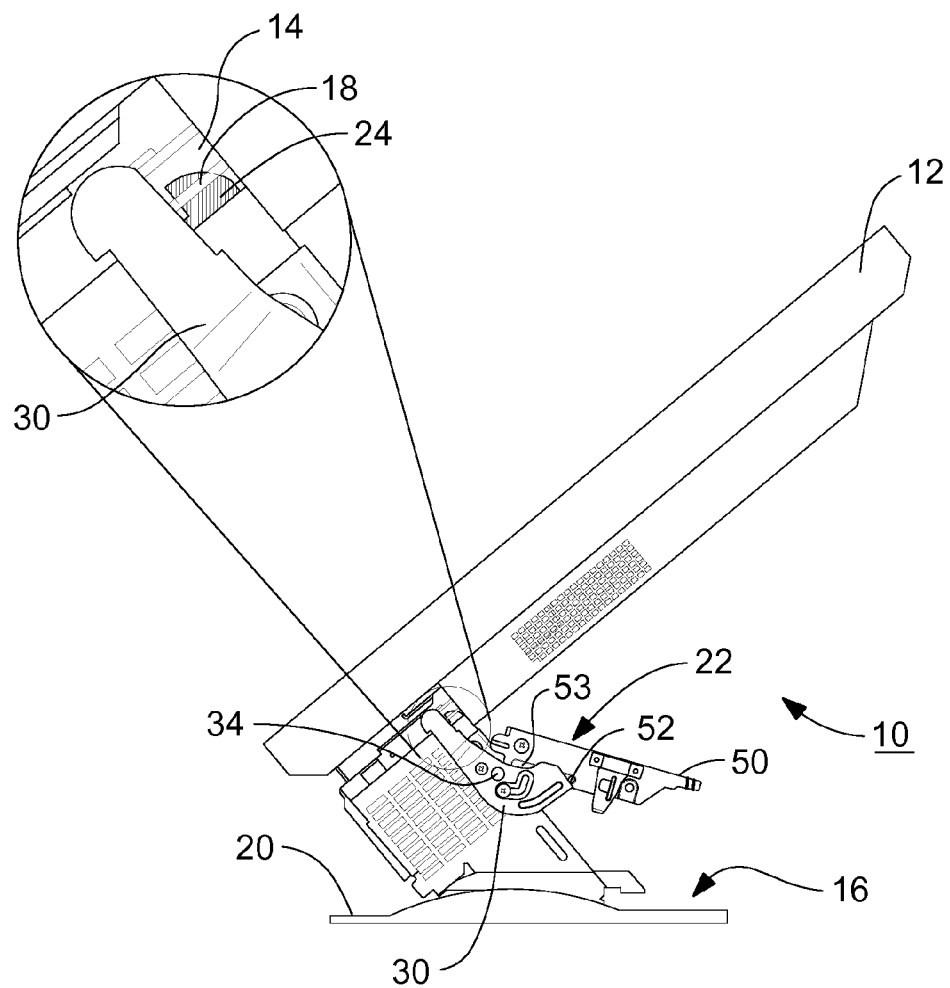
FIG. 2 sets forth a side view of a display screen assembly with a spaced-apart enlarge view of a portion thereof in which a display screen is in engagement with a base of the display screen assembly in accordance with embodiments of the present invention.
Figure 3:
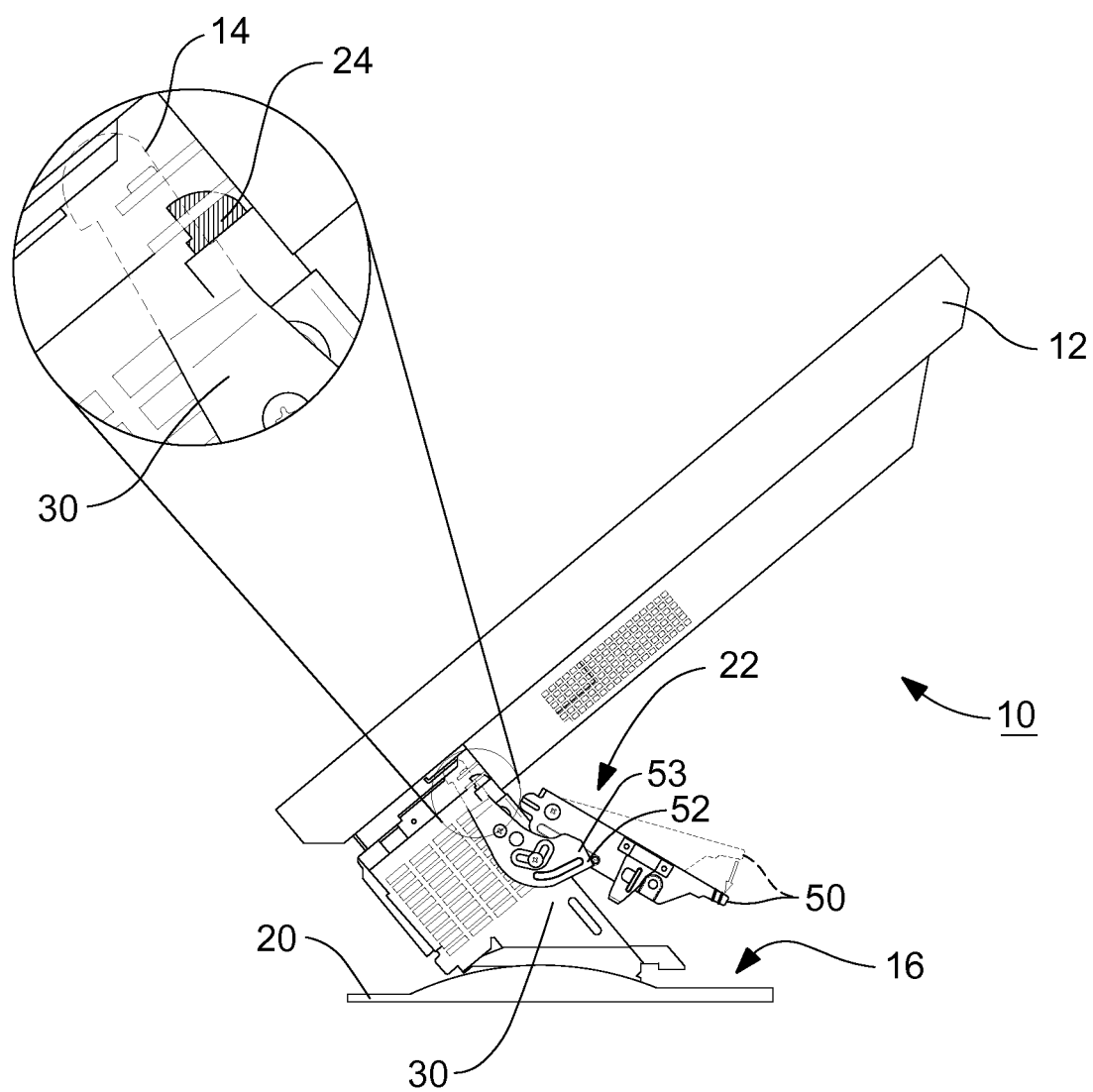
FIG. 3 sets forth a side view of a display screen assembly with a spaced-apart enlarge view of a portion thereof in which a display screen is in engagement with a base of the display screen assembly in accordance with embodiments of the present invention.
Figure 4:
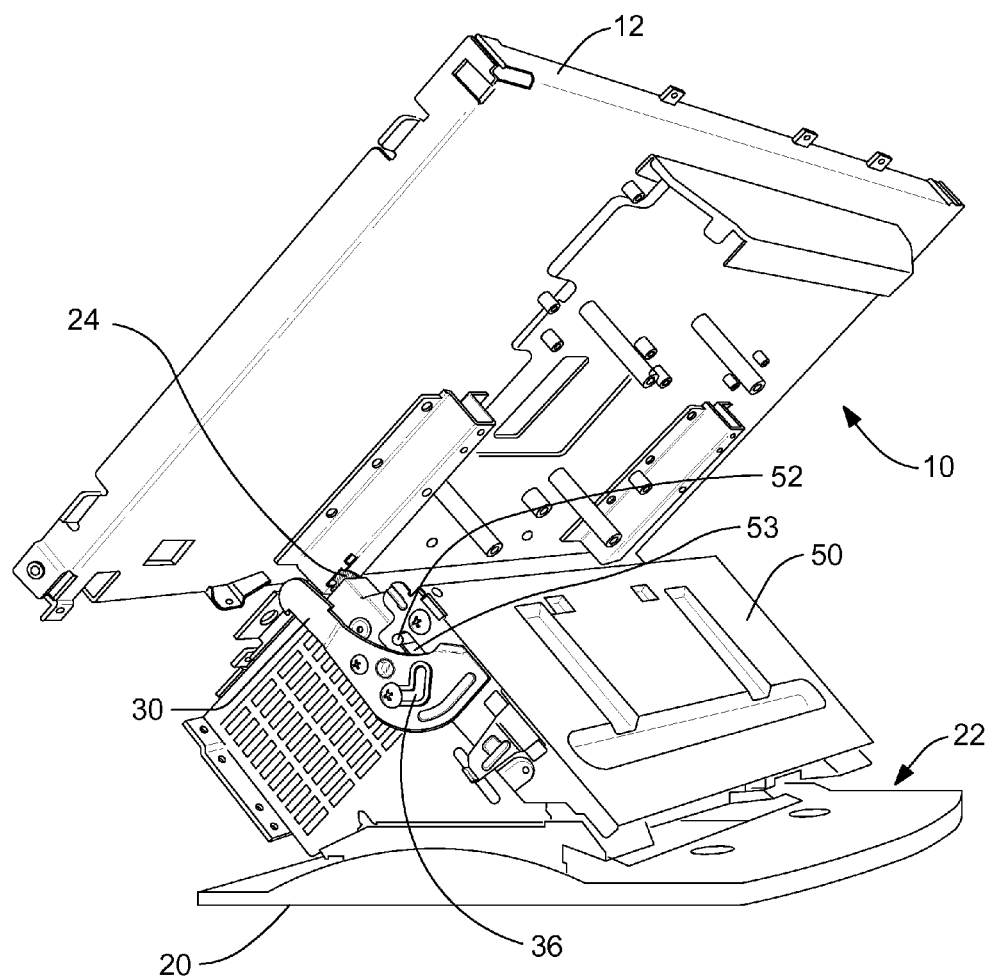
FIG. 4 sets forth a rear facing perspective view of a display screen assembly in which a casing of the display screen has been removed in accordance with embodiments of the present invention.

Operation of the lock assembly 16 is illustrated in the various views shown in FIGS. 1 through 5. As illustrated in FIG. 1, bayonet 24 has been egressed out of engagement with openings 18 and 28. This egressment of bayonet 24 is caused by pivoting of lever 30 which is operably coupled to the bayonet 24. As illustrated in FIG. 2, the bayonet 24 is ingressed into engagement with openings 18 and 28 and the lever 30 is in an unpivoted state. Cover 50 is shown opened relative to the casing 32, though it may be in a closed position. As illustrated in FIG. 3 and with additional further reference to FIG. 5, the cover 50 is configured such that pivoting movement of the cover 50 from the open to the closed position, while simultaneously engaging grip 54 to impart movement of the cam assembly 52 until the cam assembly 52 is in general alignment with lever 30, imparts movement of lever 30 to thereby egress the bayonet 24 out of the opening 18 and disengage the display screen 12 from mount assembly 16. Distal end 31 of lever 30 simultaneously acts to impart movement of the display screen 12 in a direction away from the mount assembly 16. The grip 54 may be fixed into a retracted position where the cam assembly 52 is moved rearwardly by interaction of a detent assembly 55 provided between the cover and the grip 54 that acts to bias the grip 54 into the retracted position once the user engages the grip and pulls in a direction away from the display screen 12. Once the cover 50 is pivoted into the closed position, grip 54 is released such that cam assembly 52 returns to its initial, un-retracted state in which cam assembly 52 is not in engagement with lever 30. Grip 54 may be biased into its initial state by a spring or the like. The detent assembly 55 acts to retain the grip 54 in the retracted position. A shoulder 56 is defined on the casing for engaging the detent assembly 55 upon downward rotation of the cover 50 to release the detent assembly 55 from engagement with the cam assembly 52. In this manner, when cover 50 is rotated towards the closed position and the grip 54 is in the retracted position, lever 30 is then pivoted so that the bayonet 24 is egressed and either simultaneously or shortly thereafter, the detent assembly 55 is engaged by shoulder 56 and the cam assembly 52 and grip 54 are returned to their initial positions.

In accordance with embodiments of the present invention, the display screen 12 may include one or more input/output (I/O) ports such as a VGA, USB, electrical power, and the like that are configured to be received by one or more corresponding I/O ports defined in the mount assembly 16. The cover 50 may be configured to provide selective access to the various I/O ports defined in the mount assembly 16. In this manner, the mount assembly 16 and display screen 12 may be configured such that engagement of the mount assembly 16 with the display screen 12 imparts engagement of each I/O port of the respective mount assembly 16 and display screen 12 so that the display screen 12 is, for example, powered on when engaged with the mount assembly 16 if the mount assembly 16 has power provided thereto.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A display screen assembly comprising:
   a display screen defining a channel for allowing selective engagement of the display screen; and
   a mount assembly comprising:
      a base for supporting the display screen assembly about a support surface; and a locking assembly that selectively engages the channel to thereby lock the mount assembly to the display screen, wherein the locking assembly comprises a bayonet that is actuated into the channel of the display screen to thereby selectively engage the display screen with the mount assembly, whereby the bayonet is ingressed within the channel into a locked position and egressed out of the channel into an unlocked position, and
      wherein the locking assembly includes a lever pivoted about a casing of the locking assembly that is operably coupled with the bayonet such that pivoting of the lever imparts ingress and egress translation of the bayonet; and
      wherein the lever defines a slot spaced-apart from a pivot, and a pin joins the bayonet to the slot such that the pin translates within the slot and imparts translation of the bayonet during the picoting movement of the lever.

2. The display screen assembly according to claim 1, wherein a distal end of the lever engages the display screen assembly during pivoting movement to translate the display screen assembly away from the mount assembly.

3. The display screen assembly according to claim 1, wherein the slot defines a first portion in which translation relative to the pin imparts translation to the bayonet, and further defines a second portion in which translation relative to the pin biases the bayonet in the unlocked position.

4. A display screen assembly comprising:
   a display screen defining a channel for allowing selective engagement of the display screen; and
   a mount assembly comprising:
      a base for supporting the display screen assembly about a support surface; and
      a locking assembly that selectively engages the channel to thereby lock the mount assembly to the display screen, wherein the locking assembly comprises a bayonet that is actuated into the channel of the display screen to thereby selectively engage the display screen with the mount assembly, whereby the bayonet is ingressed within the channel into a locked position and egressed out of the channel into an unlocked position;
      a cover that covers the lock assembly and is rotatable between open and closed positions, and further wherein the cover further includes a cam assembly translatable thereabout that is configured for engaging the lever when the cam assembly is in a retracted position and the cover is being rotated from the opened to the closed position.

5. The display screen assembly according to claim 4, wherein the cam assembly has a grip for translating the cam assembly into engagement with the lever and the grip is configured to retain the cam assembly in the retracted position by interaction of a detent assembly with the cam assembly.

6. The display screen assembly according to claim 4, wherein the mount assembly defines a shoulder that is configured to engage the detent assembly upon pivoting movement of the cover into the closed position to thereby release the cam assembly from the retracted position.

7. A mount assembly for a display screen, the mount assembly comprising:
   a base for supporting the display screen assembly about a support surface; and
   a locking assembly that selectively engages a channel of the display screen to thereby lock the mount assembly to the display screen, wherein the locking assembly comprises:
      a bayonet that is actuated into the channel of the display screen to thereby selectively engage the display screen with the mount assembly, whereby the bayonet is ingressed within the channel into a locked position and egressed out of the channel into an unlocked position; a lever pivoted about a casing of the locking assembly that is operably coupled with the bayonet such that pivoting of the lever imparts ingress and egress translation of the bayonet,
      wherein the lever defines a slot spaced-apart from a pivot and a pin joins the bayonet to the slot such that the pin translates within the slot and imparts translation of the bayonet during pivoting movement of the lever.

8. The mount assembly according to claim 7, wherein a distal end of the lever engages the display screen assembly during pivoting movement to translate the display screen assembly away from the mount assembly.

9. The mount assembly according to claim 7, wherein the slot defines a first portion in which pivoting of the lever relative to the pin imparts translation to the bayonet, and further defines a second portion in which pivoting of the lever relative to the pin biases the bayonet in the unlocked position.

10. The mount assembly according to claim 7, wherein the bayonet is biased into the locked position, and
    wherein the mount assembly further includes a cover that covers the lock assembly and is rotatable between open and closed positions, and further wherein the cover further includes a cam assembly translatable thereabout that is configured for engaging the lever when the cam assembly is in a retracted position and the cover is being rotated from the opened to the closed position.

11. The mount assembly according to claim 10, wherein the cam assembly has a grip for translating the cam assembly into engagement with the lever and the grip is configured to retain the cam assembly in the retracted position by interaction of a detent assembly with the cam assembly.

12. The mount assembly according to claim 11, wherein the mount assembly defines a shoulder that is configured to engage the detent assembly upon pivoting movement of the cover into the closed position to thereby release the cam assembly from the retracted position.

* * * * *